US012780413B2

(12) United States Patent
Mazars

(10) Patent No.: US 12,780,413 B2
(45) Date of Patent: Nov. 3, 2026

(54) AIRCRAFT COMPRISING AT LEAST ONE TUBULAR TANK FOR STORING AN EXTINGUISHING FLUID

(71) Applicant: Airbus Operations SAS, Toulouse (FR)

(72) Inventor: Vincent Mazars, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 158 days.

(21) Appl. No.: 18/784,158

(22) Filed: Jul. 25, 2024

(65) Prior Publication Data

US 2025/0033769 A1 Jan. 30, 2025

(30) Foreign Application Priority Data

Jul. 27, 2023 (FR) ...................................... 2308102

(51) Int. Cl.
*B64D 1/16* (2006.01)
*A62C 3/02* (2006.01)

(52) U.S. Cl.
CPC .............. *B64D 1/16* (2013.01); *A62C 3/0235* (2013.01)

(58) Field of Classification Search
CPC ... A62C 3/0228; A62C 3/0235; A62C 3/0242; A62C 13/66; A62C 13/68; A62C 13/70; A62C 13/72; B64D 1/16; B64D 1/18; B64C 1/20
See application file for complete search history.

(56) References Cited

U.S. PATENT DOCUMENTS 1,997,669 A * 4/1935 Arcieri ................. A62C 3/0242 244/136
3,698,480 A * 10/1972 Newton ................... B64D 1/16 169/53
4,195,693 A * 4/1980 Busch .................. A62C 3/0228 169/53
7,165,627 B2 * 1/2007 Hutter .................. A62C 3/0242 169/44
8,820,422 B2 * 9/2014 Parker .................... A62C 37/04 169/56
9,750,963 B2 * 9/2017 Nelson ................. A62C 3/0228
(Continued)

FOREIGN PATENT DOCUMENTS

CN 115253117 A * 11/2022 ........... A62C 3/0242
CN 218839759 U 4/2023
(Continued)

OTHER PUBLICATIONS

French Search Report for corresponding French Patent Application No. 2308102 dated Feb. 22, 2024.

*Primary Examiner* — Darren W Gorman
(74) *Attorney, Agent, or Firm* — Greer, Burns & Crain, Ltd.

(57) ABSTRACT

An aircraft with a fuselage separated into an upper part and a lower part by a floor, a tubular tank containing an extinguishing fluid, positioned in the upper part and fastened to the floor, a discharge device connected between the tubular tank and the outside, passing in succession through the floor and the fuselage, a release system movable between a retention position and a discharge position, and a control unit arranged to control the movement of the at least one release system from the retention position to the discharge position, and vice versa.

9 Claims, 5 Drawing Sheets

(56) References Cited

U.S. PATENT DOCUMENTS

| | | | | |
|---|---|---|---|---|
| 10,273,003 | B2 * | 4/2019 | Coulson .................. | B64D 1/16 |
| 2007/0246609 | A1 * | 10/2007 | Smetannikov ........... | B64D 1/16 244/136 |
| 2008/0210825 | A1 | 9/2008 | Hale et al. | |
| 2009/0065646 | A1 | 3/2009 | Hale et al. | |
| 2014/0224935 | A1 * | 8/2014 | Lazes ...................... | B64D 1/16 244/136 |

FOREIGN PATENT DOCUMENTS

| | | | | |
|---|---|---|---|---|
| EP | 2228302 | A2 | 9/2010 | |
| FR | 2610894 | A1 * | 8/1988 | ............... B64D 1/16 |
| FR | 2813277 | A1 | 3/2002 | |

* cited by examiner

AIRCRAFT COMPRISING AT LEAST ONE TUBULAR TANK FOR STORING AN EXTINGUISHING FLUID

CROSS-REFERENCES TO RELATED APPLICATIONS

This application claims the benefit of French Patent Application Number 2308102 filed on Jul. 27, 2023, the entire disclosure of which is incorporated herein by way of reference.

FIELD OF THE INVENTION

The present invention relates to adapting an airliner, that is an aircraft intended to make commercial flights for transporting passengers or goods, into an air tanker, that is a firefighting aircraft. The invention more particularly relates to the installation of the extinguishing fluid tanks in such an aircraft.

BACKGROUND OF THE INVENTION

Usually, for firefighting, it is known practice to use specifically adapted aircraft referred to as air tankers. These aircrafts are adapted, at the design stage, to take on board large volumes of extinguishing fluid (for example, a mixture of water and an extinguishing agent).

One drawback of these aircrafts lies in their relatively high design and manufacturing costs, when their use is limited.

In order to overcome these drawbacks, it is desirable to use airliners as air tankers without the need to modify them too significantly, so that they do not have to be structurally modified or reclassified.

There is therefore a need to provide a simple, low-cost solution that makes it possible to adapt an airliner into an air tanker while retaining the original structure of an airliner.

SUMMARY OF THE INVENTION

An object of the present invention is to propose an airliner having on board tubular tanks containing an extinguishing fluid that makes it possible not modify the original structure of the aircraft.

To this end, an aircraft is proposed comprising:

- a fuselage in which a substantially flat floor is fastened, separating said fuselage into an upper part and a lower part;
- at least one tubular tank intended to contain an extinguishing fluid, said at least one tubular tank being positioned in the upper part of said fuselage and being fastened to said floor;
- at least one discharge device fluidly connected between said at least one tubular tank and the outside of said aircraft, passing in succession through said floor and said fuselage;
- at least one release system movable between a retention position in which the release system prevents said extinguishing fluid from passing between said at least one tubular tank and said at least one discharge device, and a discharge position in which the release system permits said extinguishing fluid to pass between said at least one tubular tank and said at least one discharge device; and

- a control unit arranged to control the movement of said at least one release system from said retention position to said discharge position, and vice versa.

According to the invention, said at least one tubular tank has a substantially V-shaped in which the tip of the V is situated at the level of said at least one discharge device, and each tubular tank comprises a front part inclined by non-zero angle α relative to said floor.

Advantageously, each tubular tank comprises a rear part inclined by a non-zero angle relative to the floor.

As a result, it is possible to place extinguishing fluid tanks on board an airliner without having to modify its structure, and in particular without having to strengthen or modify the floor of the aircraft. In addition, the use of V-shaped tubular tanks makes it easier to discharge the extinguishing fluid from the tubular tanks. This inclination improves the flow of extinguishing fluid by gravity towards the discharge device.

According to another particular embodiment, said at least one tubular tank extends at a non-zero angle relative to said floor.

Advantageously, the aircraft comprises means for fastening said at least one tubular tank to said floor.

Advantageously, and according to the other embodiment, said means for fastening said at least one tubular tank to said floor comprise at least one skid fastened to said floor and at least two struts connecting said at least one tank to said at least one skid, and the struts are longer the further away they are from said at least one release system.

Advantageously, said at least one tubular tank comprises, at least at one end thereof, an offloading aid device comprising means for pressurizing said at least one tubular tank and pushing said extinguishing fluid towards said at least one discharge device.

Advantageously, said offloading aid device comprises a piston that moves in the direction of said at least one discharge device when said extinguishing fluid is being offloaded.

Advantageously, said offloading aid device comprises a pressurized air tank, said pressurized air tank being arranged to inject pressurized air into the tubular tank in order to move the piston towards said at least one discharge device.

Advantageously, said offloading aid device comprises an air tank positioned inside said tubular tank, wherein the air in said air tank is pressurized when said tubular tank is being filled with said extinguishing fluid or by the movement of said piston using a motorized winch.

Advantageously, said offloading aid device comprises at least one inflatable membrane, each inflatable membrane being positioned at one end of said at least one tubular tank and inflating in the direction of said at least one discharge device.

BRIEF DESCRIPTION OF THE DRAWINGS

The aforementioned features of the invention, along with others, will become more apparent on reading the following description of an exemplary embodiment and its variants, said description being given with reference to the appended drawings, in which.

DETAILED DESCRIPTION OF THE PREFERRED EMBODIMENTS

Figure 1:
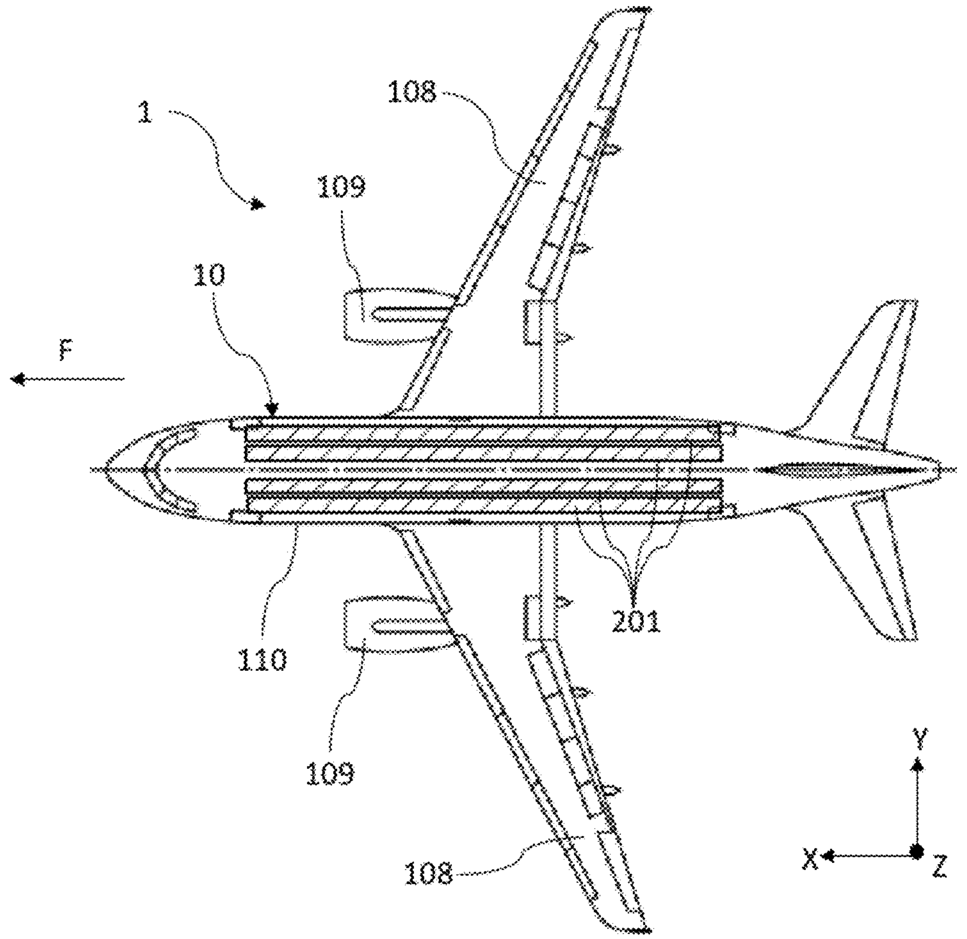
FIG. 1 is a top view of an aircraft according to a first exemplary embodiment of the invention.
Figure 10:
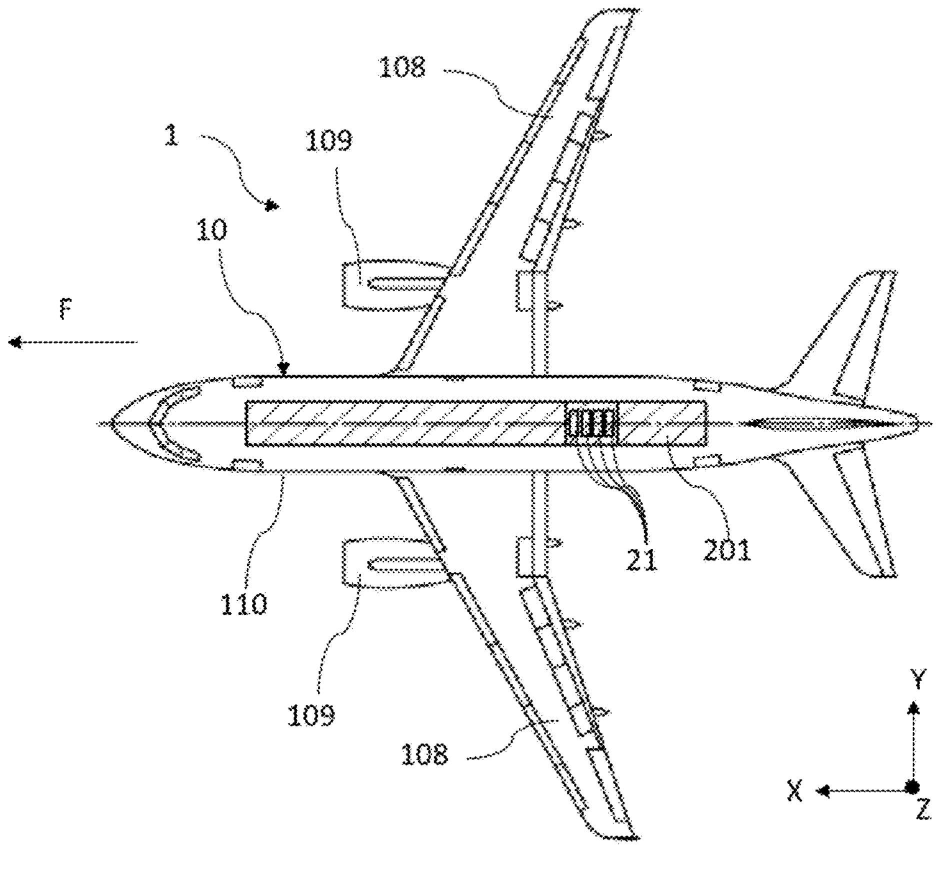
FIG. 10 is a top view of an aircraft according to a third exemplary embodiment of the invention.

FIGS. 1 and 10 show an aircraft 1 comprising a fuselage 10 and two wing boxes 108 each carrying a propulsion system 109, for example a turbojet engine or a turboprop engine.

Figure 2:
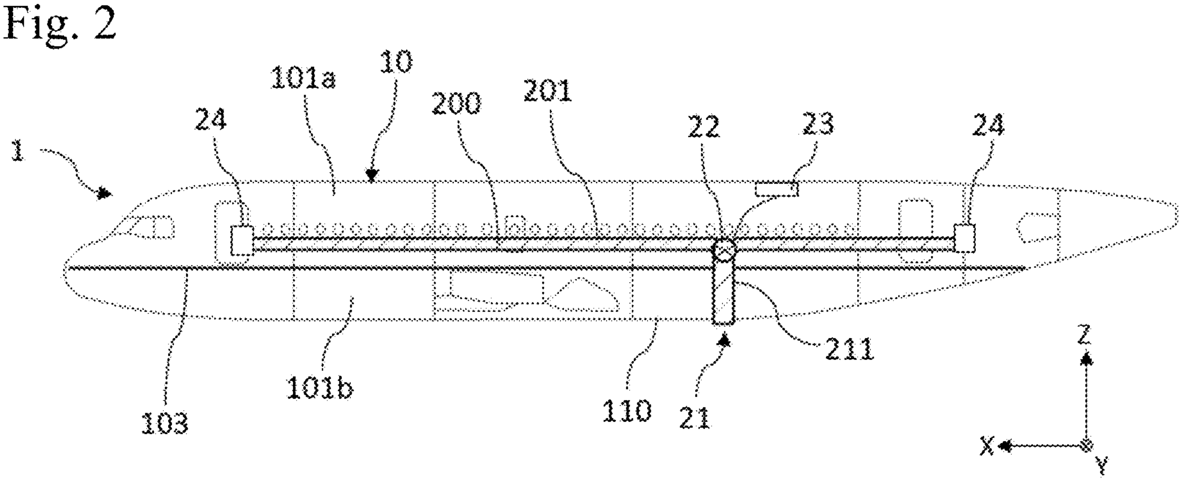
FIG. 2 is a longitudinal cross-sectional side view of the aircraft in FIG. 1.
Figure 9:
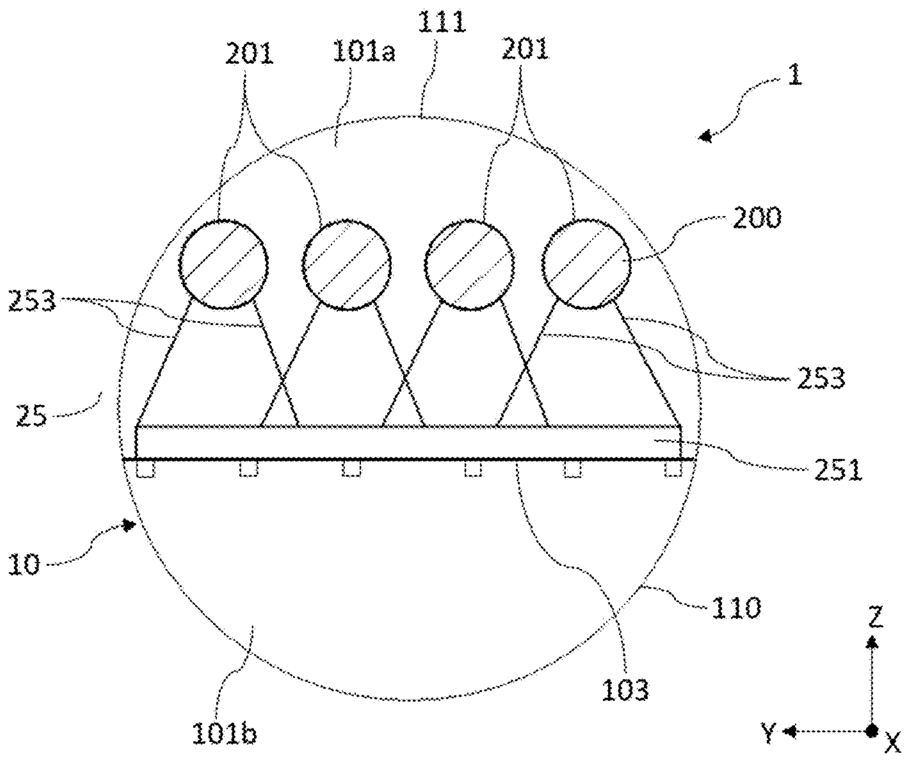
FIG. 9 is a transverse cross-sectional side view of the aircraft in FIG. 7.
Figure 11:
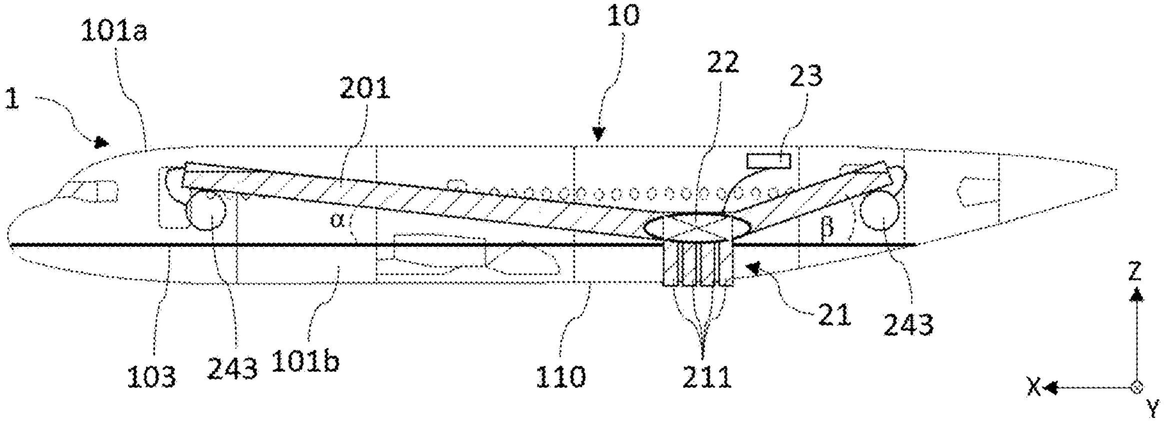
FIG. 11 is a longitudinal cross-sectional side view of the aircraft in FIG. 10; and, FIG. 12 is a transverse cross-sectional side view of the aircraft in FIG. 10.

In the following description, terms relating to position are given with reference to an aircraft in a normal flight position, that is as shown in FIGS. 2, 9 and 11. In the following description, and by convention, the longitudinal direction of the fuselage, which is horizontal when the aircraft is on the ground, is referred to as X, the transverse direction, which is horizontal when the aircraft is on the ground, is referred to as Y, and the vertical direction, which is vertical when the aircraft is on the ground, is referred to as Z, these three directions X, Y and Z being orthogonal to each other.

The aircraft 1 comprises a fuselage 10 in which a substantially flat floor 103 is fastened, which floor extends substantially in a plane parallel to the plane XY in the examples described. The floor 103 separates the fuselage 10 into an upper part 101*a* and a lower part 101*b* referred to as the "cargo zone". As the structure of the aircraft 1 is that of an airliner, the floor 103 is intended to separate the upper part 101*a* and the lower part 101*b*, which are both pressurized. The floor 103 is also intended to receive passenger seats or goods to be transported.

The principal of the invention consists in installing one or more tanks 201 containing an extinguishing fluid 200 in the upper part 101*a* of the aircraft 1, and more particularly fastening each one to the floor 103 of the aircraft 1. Preferably, the tanks 201 each have a tubular shape and extend longitudinally on the floor 103 of the aircraft 1 so as to distribute the weight of the tubular tanks 201 over the greatest length of the floor 103. As a result, it is possible to use a so-called standard airliner without major structural modifications, simply by removing the passenger seats in the case of a passenger aircraft. The invention therefore proposes a simple, low-cost solution for adapting an airliner intended for transporting passengers or goods into an air tanker intended for firefighting.

The aircraft 1 comprises at least one discharge device 21 fluidly connected between the tubular tanks 201 and the outside 110 of the aircraft 1, passing in succession through the floor 103 and the fuselage 10. One discharge device 21 can be associated with each tubular tank 201, or one discharge device 21 can be fluidly connected to a plurality of tubular tanks 201.

In this example, the discharge device 21 takes the form of a discharge pipe 211 that extends generally parallel to the axis Z. Other orientations of the discharge pipe 211 can be envisaged.

The aircraft 1 also comprises, for each discharge device 21, a system 22 for releasing the extinguishing fluid 200. The release system 22 is movable between a retention position in which the release system 22 prevents the extinguishing fluid 200 from passing between the tubular tank or tanks 201 and the discharge device 21, and a discharge position in which the release system 22 permits the extinguishing fluid 200 to pass between the tubular tank or tanks 201 and the discharge device 21. The aircraft 1 can therefore comprise a plurality of release systems 22 when a plurality of discharge devices 21 are installed. The installation of a single release system 22 for a plurality of discharge devices 21 can also be envisaged. Such a release system 22 is conventional and is not therefore described in detail herein. For example, the release system 22 can take the form of a valve, a flap or any other type of mechanism that makes it possible to manage the release flow rate of the extinguishing fluid 200.

In the examples illustrated, the system 22 for releasing the extinguishing fluid 200 is positioned at the junction between the tubular tanks 201 and the discharge pipe 211 of the discharge device 21. Positioning the release system 22 as close as possible to the downstream orifice of the discharge device could also be envisaged in order to optimize, that is maximize, the volume of the tubular tanks 201 so as to take on board a maximum quantity of extinguishing fluid 200.

The aircraft 1 further comprises a control unit 23 arranged to control the movement of the release system or systems 22 from the retention position to the discharge position, and vice versa. Preferably, the aircraft 1 comprises a single control unit 23 that makes it possible to control all of the release systems 22. The installation of one control unit 23 for each release system 22 could be envisaged. The release systems 22 and the control unit 23 can be manual, electric, pneumatic, electropneumatic, hydraulic, etc.

Preferably, the control unit 23 manages the movement of the release systems 22, so that the flow rate of the tubular tanks 201 is managed. More particularly, the control unit 23 ensures that the tubular tanks 201 are empty at the same time in order to optimize the stability of the aircraft. To this end, it is possible for the discharge rate of each tubular tank 201 to be different.

Generally, the tanks 201 are tubular and are positioned in the upper part 101*a* of the fuselage 10. In the examples shown in the figures, the tubular tanks 201 have a circular cross-section. Obviously, it will be understood that differently shaped cross-sections, for example rectangular or elliptical, can be envisaged without departing from the scope of the invention. The tubular tanks 201 preferably extend longitudinally along the floor 103, that is generally parallel to the longitudinal axis X in the case of the first embodiment of the invention and at a non-zero angle $\alpha$ relative to the floor 103 in the case of the second and third embodiments. The weight of the tubular tanks 201 containing the extinguishing fluid 200 is thus distributed optimally over the whole surface area of the floor 103. The shape and particular position of the tubular tanks therefore make it possible not to modify or strengthen the floor 103, which is originally intended for transporting passengers or goods.

Figure 3:
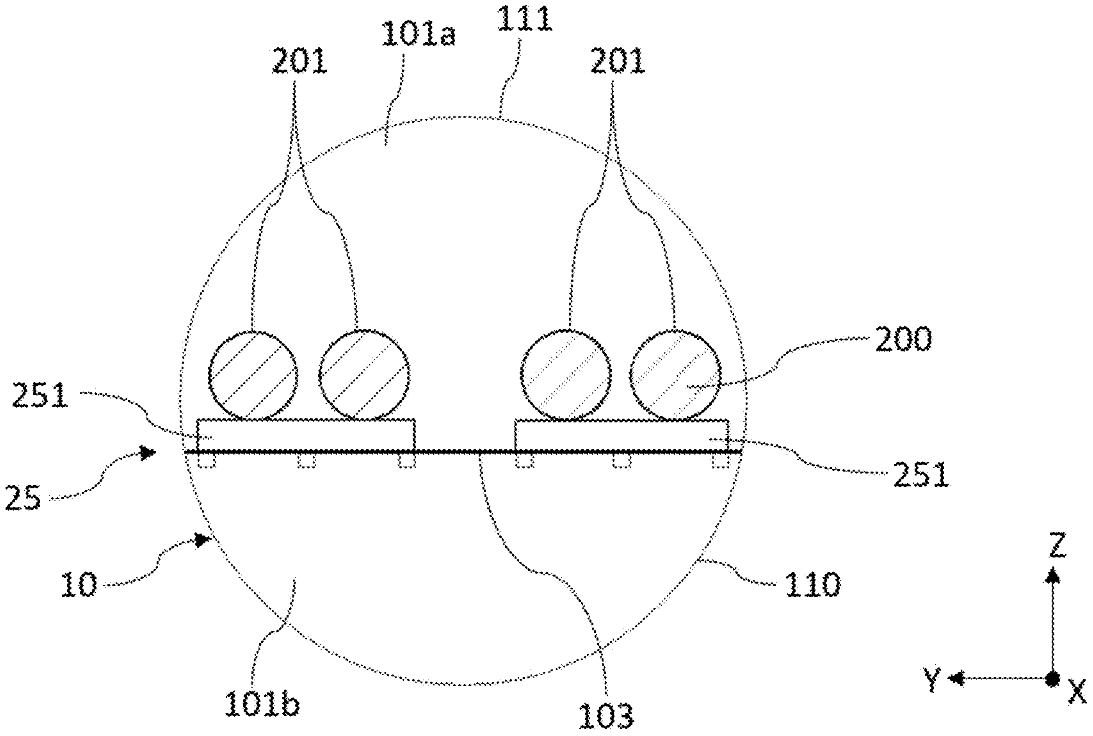
FIG. 3 is a transverse cross-sectional side view of the aircraft in FIG. 1.

In the first embodiment of the invention shown in FIGS. 1 to 3, the aircraft 1 comprises at least one tubular tank 201 intended to contain an extinguishing fluid 200. In this first embodiment, the aircraft 1 comprises four tubular tanks. It will be understood that the aircraft 1 could comprise just a single tubular tank 201 or a greater number of tubular tanks 201 without departing from the scope of the invention.

In this first exemplary embodiment, the tubular tanks 201 are fastened parallel to the floor 103. The tubular tanks 201 are fastened to the floor 103 using fastening means 25.

In the example illustrated in FIG. 3, the fastening means 25 take the form of skids 251 that are fastened to the floor 103 and to which the tubular tanks 201 are fastened. More particularly, here the four tubular tanks 201 are fastened in pairs to the skids 251 fastened to the floor 103. For example, the skids 251 are fastened at even distances over the whole length of the tubular tanks 201. The distance separating two skids 251 holding a single pair of tubular tanks 201 is selected so that the tubular tanks 201 keep their initial shape, that is the tubular tanks 201 must not deform, or flex, so as to promote the offloading of the extinguishing fluid.

In this description, the fastening means 25 take the form of skids 251 and struts 253. Obviously, it will be understood that other forms of fastening means 25 can be envisaged without departing from the scope of the invention. For example, the fastening means 25 can comprise hoops around each tank, straps, struts, skids or a combination of these elements in particular.

In this example, a first pair of tubular tanks 201 is fastened on the port part of the floor 103, while a second pair of tubular tanks 201 is fastened on the starboard part of the floor 103. Such positioning makes it possible to optimize the distribution of the weight of the tubular tanks over the whole floor 103.

Other positioning can obviously be envisaged depending on the number of tubular tanks 201 taken on board, in particular.

According to one particular embodiment, in order to optimize the discharging of the extinguishing fluid 200 from the tubular tanks 201, each tubular tank 201 comprises one or more devices 24 for assisting the offloading of the extinguishing fluid 200. Offloading aid device 24 comprises means for pressurizing the tubular tank 201 so as to push the extinguishing fluid 200 towards the discharge device 21. The tubular tank 201 can for example comprise a single offloading aid device 24, positioned at a first end 207 of the tubular tank 201, when the discharge device 21 of the tubular tank 201 is situated at the other end of the tubular tank 201. If the discharge device 21 is situated between the two ends of the tubular tank 201, the installation of one offloading aid device 24 at each end of the tubular tank 201 can be envisaged so as to push the extinguishing fluid 200 towards the discharge device 21.

Figure 4:
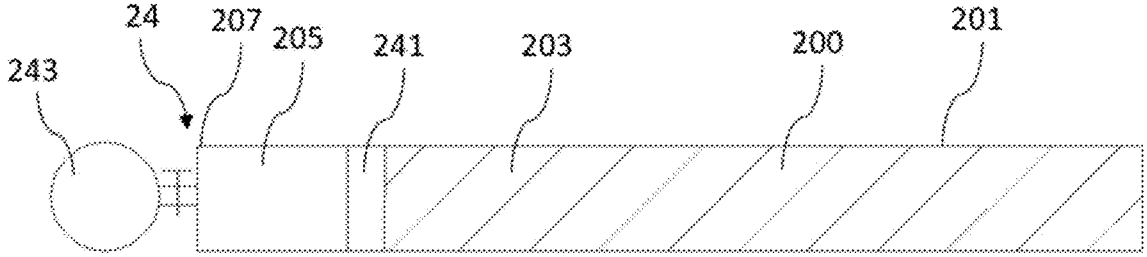
FIG. 4 is a longitudinal cross-sectional side view of an example of an offloading aid device according to a first variant.

FIGS. 4, 5, 6 and 7 illustrate different examples of offloading aid devices 24. FIG. 4 illustrates a first variant of the offloading aid device 24 that comprises a piston 241 positioned in the tubular tank 201 and movable between a position distant from the discharge device 21 in which the extinguishing fluid 200 is not pressurized and a position close to the discharge device 21 in which the extinguishing fluid 200 is pressurized. The piston 241 separates the tubular tank 201 into two parts, namely an extinguishing fluid chamber 203 situated on the side of the discharge device 21 and an air chamber 205 situated on the side of the end 207 of the tubular tank 201. The piston 241 is movable in the tubular tank 201 and moves in the direction of the discharge device 21 (not illustrated in these figures) in order to pressurize the tubular tank 201 and thus push the extinguishing fluid 200 towards the discharge device 21. As a result, the offloading of the extinguishing fluid 200 is controlled and optimized.

According to this first variant, the offloading aid device 24 comprises a pressurized air tank 243 that is positioned outside the tubular tank 201. This pressurized air tank 243 makes it possible to inject, at the moment of offloading the extinguishing fluid 200, pressurized air into the air chamber 205 of the tubular tank 201 so as to move the piston 241 in the direction of the discharge device 21.

Figure 5:
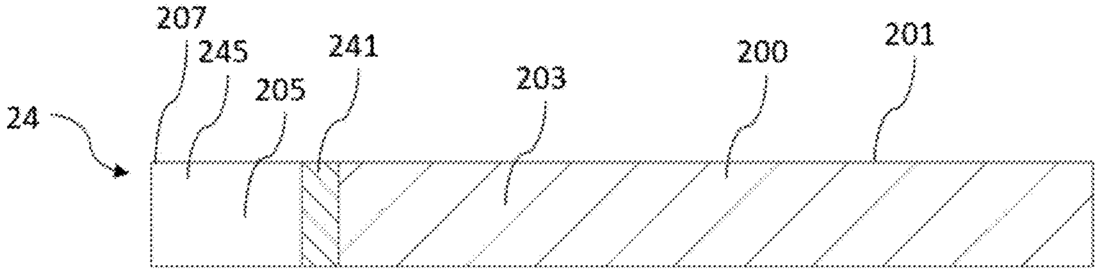
FIG. 5 is a longitudinal cross-sectional side view of an offloading aid device according a second variant.

FIG. 5 illustrates a second variant of the offloading aid device 24, also comprising a piston 241 separating the tubular tank 201 into an extinguishing fluid chamber 203 and an air chamber 205. In this variant, the air chamber 205 forms an internal pressurized air tank 245, in that here the pressurized air tank 245 is positioned inside the tubular tank 201, between the piston 241 and the end 207 of the tubular tank 201 opposite the discharge device 21.

More particularly, the pressurized air tank 245 is pressurized when the tubular tank 201 is being filled with the extinguishing fluid 200. At the moment of filling the tubular tank 201, the piston 241 is thus pushed towards the end 207 of the tubular tank 201, pressurizing the air in the air chamber 205. During offloading, the pressurized air in the air chamber 205 will move the piston 241 towards the discharge device 21. The pressurized air tank 245 therefore acts in this example like a spring compressing when the tubular tank 201 is being filled and relaxing during offloading.

Figure 6:
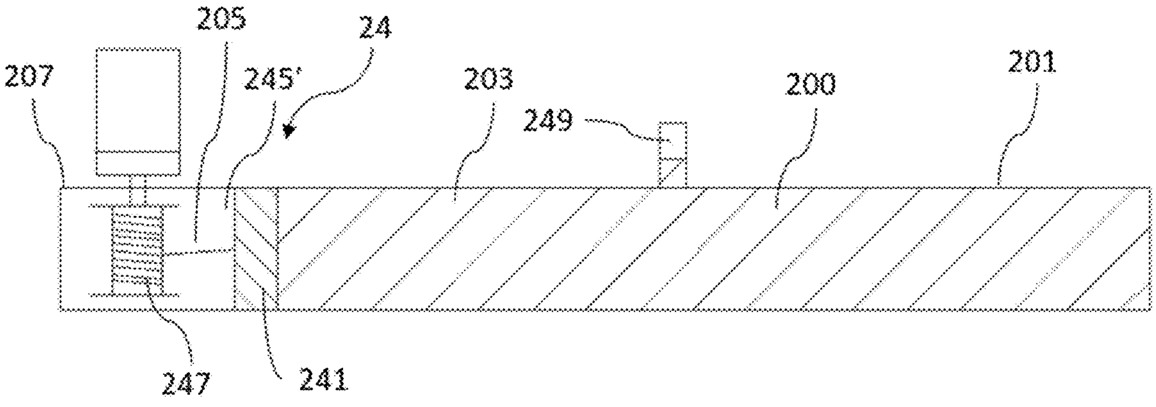
FIG. 6 is a longitudinal cross-sectional side view of an offloading aid device according a third variant.

FIG. 6 illustrates a third variant of the offloading aid device 24, also comprising a piston 241 separating the tubular tank into an extinguishing fluid chamber 203 and an air chamber 205. In this variant, the air chamber 205 thus also forms an internal pressurized air tank 245' but the air in the air chamber 205 is pressurized using a motorized winch 247 that makes it possible to pull the piston 241 towards the end 207 of the tubular tank 201. During offloading, the tension in the cable of the winch 247 connecting the piston 241 is released and the pressurized air in the air chamber 205 moves the piston 241 towards the discharge device 21. Here, the pressurized air tank 245' also acts like a spring compressing by means of the winch 247 and relaxing during offloading.

In the case of these three variants, the piston 241 is held in position before offloading by the cable of the winch 247 or by a locking system that can be released by the control unit.

An automatic air vent valve 249 can further be provided in the extinguishing fluid chamber 203 so as to allow the automatic venting of the air when the tubular tank is being filled with extinguishing fluid 200.

In the examples of the offloading aid device 24 described above, the piston 241 is pushed towards the discharge device 21 to assist the discharge of the extinguishing fluid 200. In one variant, not illustrated, pulling the piston in the direction of the discharge device 21 can be envisaged. To this end, the piston 241 can be assisted in its movement by means of a pulling mechanism, for example a hydraulic mechanism or a motorized winch mechanism as described above, or by means of an elastomeric spring system. In this variant, retaining the air chamber 205 to assist the movement of the piston can be envisaged, as the air present in the air chamber 205 would also be pressurized, as described above.

Figure 7:
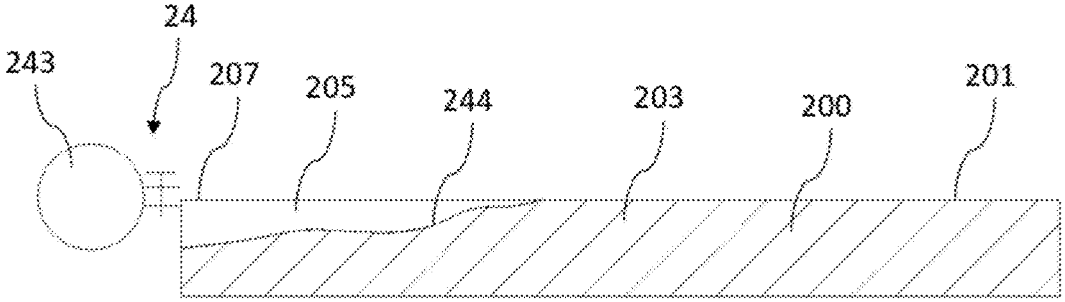
FIG. 7 is a longitudinal cross-sectional side view of an offloading aid device according to a fourth variant.

FIG. 7 illustrates a fourth variant of the offloading aid device 24 comprising an inflatable membrane 244 positioned in the tubular tank 201 and separating the tubular tank 201 into an extinguishing fluid chamber 203 and an air chamber 205. In this variant, the offloading aid device 24 comprises a pressurized air tank 243 that makes it possible to inject pressurized air into the air chamber 205 in order to inflate the inflatable membrane 244. The inflation of the inflatable membrane 244, from the end 207 towards the discharge device 21, makes it possible to push the extinguishing fluid 200 towards the discharge device 21 and therefore to facilitate the offloading of the extinguishing fluid 200.

The offloading aid device 24 have been described herein as pneumatic devices. It will be understood with ease that the offloading aid devices 24 can operate with other fluids, such as water, oil or gas, for example.

Controlling the discharge devices 24 using the control unit 23 can be envisaged.

Figure 8:
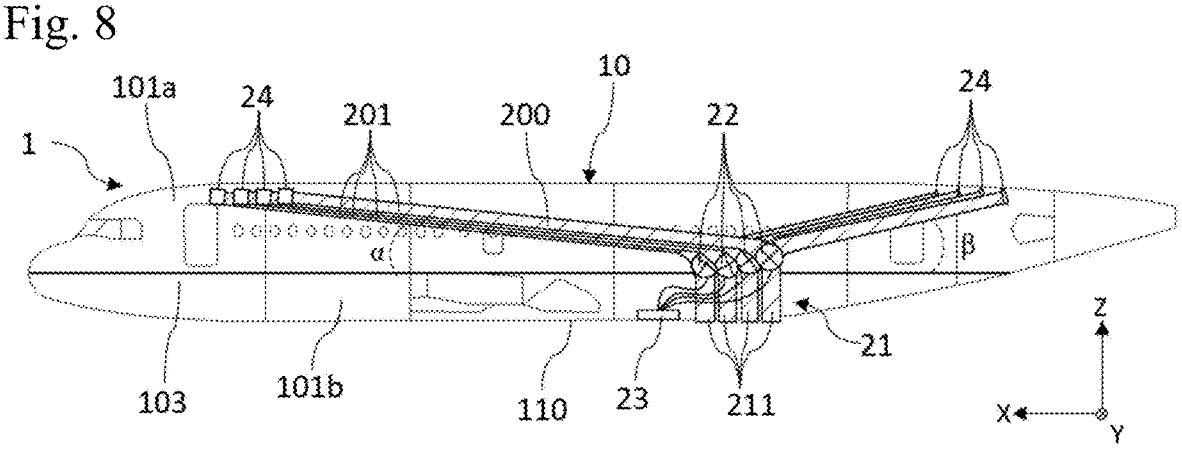
FIG. 8 is a longitudinal cross-sectional side view of an aircraft according to a second exemplary embodiment of the invention.

FIGS. 8 and 9 illustrate a second embodiment of the invention. The second embodiment differs from the first example in that the tubular tanks 201 (four in number in this example) are fastened here to the floor 103 at a non-zero angle α relative to the floor 103. In other words, the tubular tanks 201 are inclined relative to the floor 103. The tubular tanks 201 are inclined in the direction of the discharge devices 21, because in this example, each tubular tank 201 comprises a discharge device 21 and a corresponding release system 22. The tubular tanks 201 are therefore oriented descending towards the discharge devices 21.

Preferably, the angle α of inclination of the tubular tanks 201 relative to the floor 103 is greater than an angle of attack of the aircraft 1 when it is cruising, that is in flight other than during the take-off and landing phases. The inclination of the tubular tanks 201 towards the discharge devices 21 makes it possible to improve the offloading of the extinguishing fluid 200.

In this example, the discharge devices 21 are positioned between the two ends of the tubular tanks 201 (in other words, the discharge devices 21 are not positioned at one end of the tubular tanks 201). In this case, and in order to satisfy the angle α of inclination of the tubular tanks 201, the tanks are substantially V-shaped, wherein the tip of the V is situated at the level of the discharge device 21 and here somewhat towards the rear of the aircraft 1. Each tubular tank 201 thus comprises a front part inclined by an angle α from top to bottom moving from the front towards the discharge device 21 and a rear part inclined by a non-zero angle β relative to the floor 103 from top to bottom moving from the rear towards the discharge device 21.

The angles α and β are selected as a function of the geometry of the fuselage 10 of the aircraft 1. Preferably, the angles α and β are as large as possible to boost the discharging of the tubular tanks 201. The angles α and β therefore take into account in particular the location of the floor 103 and the height of the fuselage 10, and more particularly the height between the floor 103 and the ceiling 111. Angles α and β can be envisaged that make it possible for the tubular tanks 201 to come into contact with the roof 111 of the fuselage 10 of the aircraft, at the ends situated on the side of the cockpit and on the side of the tail of the aircraft respectively.

The use of V-shaped tubular tanks 201 improves the discharge of extinguishing fluid 200 from the tubular tanks 201. This inclination improves the gravity flow of extinguishing fluid 200 towards the discharge device 21.

Compared with a tubular tank 201 with a rectilinear cross-section, a V-shaped tubular tank 201 also optimizes the flow of extinguishing fluid 200 into the tubular tank 201 so as to provide an optimum discharging speed.

Finally, the use of V-shaped tubular tanks 201 offers optimum mass distribution over the surface of the floor 103, so as to limit the impact of the tubular tank 201 on the structure of the floor 103. In this way, an airliner can be used without having to modify its structure, and in particular without having to reinforce or modify the aircraft floor.

As illustrated in FIG. 8, the inclination of the tubular tanks 201 is compatible with the installation of an offloading aid device as described with reference to FIGS. 4 to 7. As a result, the offloading of the extinguishing fluid 200 is further optimized.

As illustrated in FIG. 9, the tubular tanks 201 are fastened to the floor 103 at a plurality of fastening points evenly distributed along the tubular tanks 201 using fastening means 25, which here take the form of a skid 251 and supporting struts 253 connecting the tubular tank 201 to the skid 251. In this example, the aircraft 1 has, at each fastening point, just one skid 251 fastened to the floor 103 and holding all of the tubular tanks 201 by means of struts 253. The installation of a greater number of skids 251 could easily be envisaged (for example one skid 251 for each tubular tank 201) at each fastening point. In this example, each tubular tank 201 is fastened to the skid 251 by a plurality of pairs of struts 253 that extend inclined relative to each other and towards each other. Obviously, it will be understood that fastening the struts 253 directly between the tubular tank 201 and the floor 103 of the aircraft 1, that is, without installing the skid 251, could also be envisaged.

The fastening points of the tubular tanks are distributed, for example at even distances, over the length of the tubular tank 201 so as to prevent the deformation thereof. With respect to footprint, the struts 253 of two adjacent tubular tanks 201 can cross over so as to limit the surface area necessary for fastening the tubular tanks 201 to the floor 103. The length of the struts 253 is selected so as to make it possible to obtain the desired angle α of inclination, that is, the struts 253 are longer the further away they are from said at least one release system 22.

It will be understood that the installation of supporting struts 253 is also compatible with the fastening of the tubular tanks 201 of the first exemplary embodiment, in which the tubular tanks are fastened parallel to the floor 103.

Figure 12:
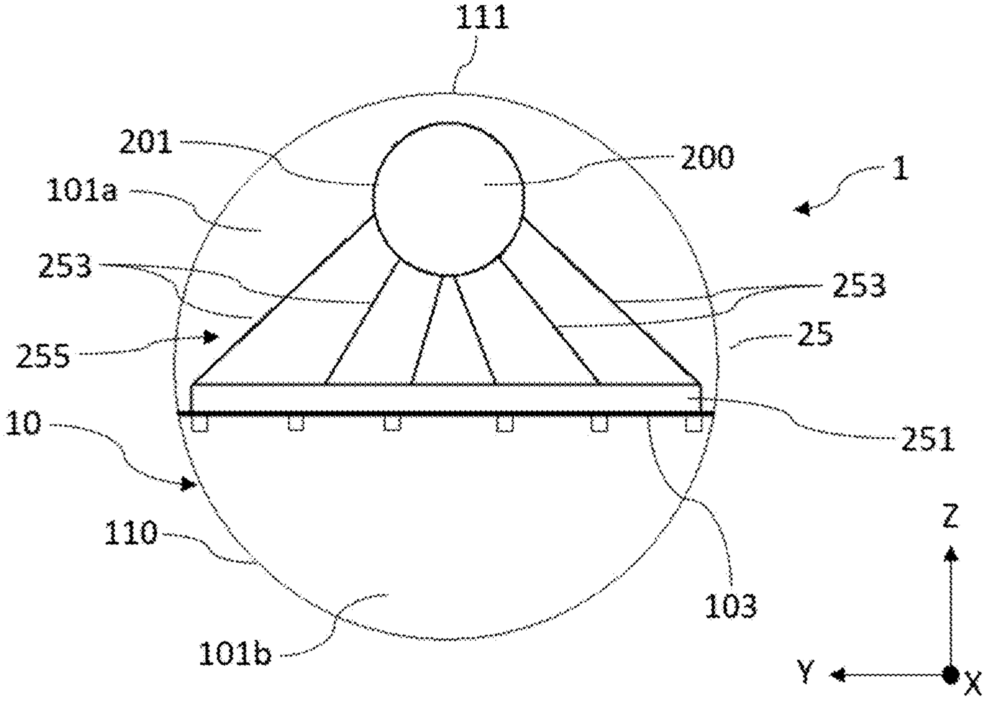

FIGS. 10, 11 and 12 illustrate a third exemplary embodiment of the invention. The third exemplary embodiment differs from the second example in that the aircraft 1 only has a single tubular tank 201, preferably with larger dimensions. In this example, the tubular tank 201 is fastened to the floor 103 at an angle α relative to the floor 103. Obviously, it will be understood that the tank could be fastened generally parallel to the floor 103 as in the first exemplary embodiment.

In this example, the tubular tank 201 comprises four discharge devices 21 each comprising a discharge pipe 211. In this example, the discharge devices 21 are positioned between the two ends of the tubular tank 201 (in other words, the discharge devices 21 are not positioned at one end of the tubular tank 201). In this case, and in order to satisfy the angle α of inclination of the tubular tank 201, the tank is substantially V-shaped, wherein the tip of the V is situated at the level of the discharge devices 21 and here somewhat towards the rear of the aircraft 1.

In this example, a single release system 22 is installed and makes it possible to permit or prevent the passage of the extinguishing fluid 200 between the tubular tank 201 and the discharge devices 21. The installation of one release system 22 for each of the discharge devices 21 could also be envisaged.

In this example, the tubular tank 201 does not have any offloading aid devices 24 as described above. The extinguishing fluid 200 is therefore discharged by gravity and, optionally, discharge is assisted by means of air present in the tubular tank 201, which would be pressurized when the tubular tank 201 is being filled, or by an external air tank 243.

However, it will be understood that this third exemplary embodiment is compatible with the installation of an offloading aid device 24 selected for example from those described above with reference to FIGS. 4 to 7.

As illustrated in FIG. 12, the tubular tank 201 is fastened to the floor 103 at multiple fastening points using fastening means 25 that here take the form of a skid 251 fastened to the floor and a set 255 of supporting struts 253 positioned between the skid 251 and the tubular tank 201. It will therefore be understood that a plurality of skids 251 and a plurality of sets 255 of struts 253 are installed over the length of the tubular tank 201 so as to prevent the deformation thereof. Here, the struts 253 of a set 255 are positioned substantially in an inverted V shape between the tubular tank 201 and the skid 251. Other positions of the struts 253 can be envisaged.

The tubular tank 201 of the third exemplary embodiment can for example have a diameter (when it has a circular cross-section) of approximately 80 centimeters. When a plurality of tubular tanks 201 are installed, the diameter of the tubular tanks 201 is smaller, for example of the order of 40 cm. In any case, the dimensions of the tubular tanks 201 are determined so that they are appropriate for the permissible load of the floor 103 of the airliner 1 without having to carry out major structural modifications.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

a fuselage in which a flat floor is fastened, the flat floor separating said fuselage into an upper part and a lower part;

at least one tubular tank configured to contain an extinguishing fluid, said at least one tubular tank being positioned in the upper part of said fuselage and being fastened to said flat floor;

at least one discharge device fluidly connected between said at least one tubular tank and an outside of said aircraft, the at least one discharge device passing in succession through said flat floor and said fuselage;

at least one release system configured to move between a retention position in which the at least one release system prevents said extinguishing fluid from passing between said at least one tubular tank and said at least one discharge device, and a discharge position in which the at least one release system permits said extinguishing fluid to pass between said at least one tubular tank and said at least one discharge device; and a control unit configured to control a movement of said at least one release system from said retention position to said discharge position and from said discharge position to said retention position, wherein said at least one tubular tank has a V-shape in which a tip of the V is situated at a level of said at least one discharge device, and wherein each tubular tank comprises a front part inclined by a non-zero angle relative to said flat floor.

2. The aircraft according to claim 1, wherein each tubular tank comprises a rear part inclined by a second non-zero angle relative to the floor.

3. The aircraft according to claim 1, further comprising:

means for fastening said at least one tubular tank to said flat floor.

4. The aircraft according to claim 3, wherein said means for fastening comprise at least one skid fastened to said flat floor and at least two struts connecting said at least one tubular tank to said at least one skid, wherein the at least two struts are longer the further away they are from said at least one release system.

5. The aircraft according to claim 1, wherein said at least one tubular tank comprises, at least at one end thereof, an offloading aid device comprising means for pressurizing said at least one tubular tank and pushing said extinguishing fluid towards said at least one discharge device.

6. The aircraft according to claim 5, wherein said offloading aid device comprises a piston positioned inside said at least one tubular tank that moves in a direction of said at least one discharge device when said extinguishing fluid is being offloaded.

7. The aircraft according to claim 6, wherein said offloading aid device comprises a pressurized air tank, said pressurized air tank being arranged to inject pressurized air into the at least one tubular tank in order to move the piston towards said at least one discharge device.

8. The aircraft according to claim 7, wherein said offloading aid device comprises a pressurized air tank positioned inside said at least one tubular tank, wherein air in said pressurized air tank is pressurized when said at least one tubular tank is being filled with said extinguishing fluid or by a movement of said piston using a motorized winch.

9. The aircraft according to claim 5, wherein said offloading aid device comprises a pressurized air tank and at least one inflatable membrane, each inflatable membrane being positioned at one end of said at least one tubular tank, said pressurized air tank arranged to inject pressurized air into said at least one inflatable membrane in order to inflate said at least one inflatable membrane in a direction of said at least one discharge device.

* * * * *